(12) United States Patent
Shlens et al.

(10) Patent No.: US 11,205,099 B2
(45) Date of Patent: Dec. 21, 2021

(54) TRAINING NEURAL NETWORKS USING DATA AUGMENTATION POLICIES

(71) Applicant: Google LLC, Mountain View, CA (US)

(72) Inventors: Jonathon Shlens, San Francisco, CA (US); Quoc V. Le, Sunnyvale, CA (US); Ekin Dogus Cubuk, Sunnyvale, CA (US); Barret Zoph, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 16/833,449

(22) Filed: Mar. 27, 2020

(65) Prior Publication Data

US 2021/0097348 A1 Apr. 1, 2021

Related U.S. Application Data

(60) Provisional application No. 62/909,216, filed on Oct. 1, 2019.

(51) Int. Cl.
*G06K 9/62* (2006.01)
*G06N 3/08* (2006.01)
*G06N 3/04* (2006.01)

(52) U.S. Cl.
CPC ......... *G06K 9/6262* (2013.01); *G06K 9/6256* (2013.01); *G06N 3/08* (2013.01); *G06N 3/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0032285 | A1* | 2/2017 | Sharma | G06N 3/0454 |
| 2018/0293517 | A1* | 10/2018 | Browne | G06N 5/04 |
| 2018/0308013 | A1* | 10/2018 | O'Shea | H04W 24/08 |
| 2018/0357514 | A1* | 12/2018 | Zisimopoulos | G06N 3/0472 |
| 2019/0325265 | A1* | 10/2019 | Lecue | G06N 3/08 |

(Continued)

OTHER PUBLICATIONS

Mingyang Geng,"Learning data augmentation policies using augmented random search", Nov. 12, 2018, Machine Learning (cs.LG); Computer Vision and Pattern Recognition , arXiv:1811.04768v1) ,'pp. 1-4.*

(Continued)

*Primary Examiner* — Omar S Ismail
(74) *Attorney, Agent, or Firm* — Fish & Richardson P.C.

(57) ABSTRACT

Methods, systems, and apparatus, including computer programs encoded on computer storage media, for training a machine learning model. One of the methods includes obtaining a training data set for training a machine learning model, the training data set comprising a plurality of training inputs; determining a plurality of data augmentation policies, wherein each data augmentation policy defines a procedure for processing a training input to generate a transformed training input; for each data augmentation policy, training the machine learning model using the data augmentation policy; determining, for each data augmentation policy, a quality measure of the machine learning model that has been trained using the data augmentation policy; and selecting a final data augmentation policy based using the quality measures of the machine learning models.

20 Claims, 3 Drawing Sheets

(56) References Cited

U.S. PATENT DOCUMENTS

| | | | |
|---|---|---|---|
| 2019/0354808 A1* | 11/2019 | Park | G10L 15/16 |
| 2019/0370637 A1* | 12/2019 | Dunning | G06F 17/18 |
| 2020/0142421 A1* | 5/2020 | Palanisamy | G06K 9/00791 |

OTHER PUBLICATIONS

Sheng-Wei Huang,"AugGAN: Cross Domain Adaptation with GAN-based Data Augmentation",Sep. 2018,Proceedings of the European Conference on Computer Vision (ECCV),2018,pp. 1-12.*
Ben Hoyle,"Data augmentation for machine learning redshifts applied to Sloan Digital Sky Survey galaxies",Mar. 17, 2015,Royak Astronomical Society, MNRAS 450, 305-316 (2015), pp. 306-313.*
Ghouthi Boukli Hacene,"Transfer Incremental Learning Using Data Augmentation", Dec. 6, 2018,applied science,Appl. Sci. 2018, 8, 2512; doi:10.3390/app8122512.*
Antoniou et al., "Data augmentation generative adversarial networks", arXiv:1711.04340, Nov. 2017, 10 pages.
Chen et al., "Deeplab: Semantic image segmentation with deep convolutional nets, atrous convolution, and fully connected crfs", IEEE transactions on pattern analysis and machine intelligence, Apr. 2017, 40(4):834 848.
Chen et al., "Searching for efficient multi-scale architectures for dense image prediction", Advances in Neural Information Processing Systems, Sep. 2018, pp. 8699-8710.
Ciresan et al., "Multi-column deep neural networks for image classification", IEEE Conference on Computer Vision and Pattern Recognition, Jul. 2012, pp. 3642-3649.
Cubuk et al., "Autoaugment: Learning augmentation policies from data", arXiv:1805.09501, 2018, 14 pages.
Deng et al., "Imagenet: A large-scale hierarchical image database" IEEE Conference on Computer Vision and Pattern Recognition, Jun. 2009, 8 pages.
DeVries et al., "Improved regularization of convolutional neural networks with cutout", arXiv:1708.04552, Aug. 2017, 8 pages.
DeVries et al., "Dataset augmentation in feature space", arXiv: 1702.05538, Feb. 2017, 12 pages.
Dwibedi et al., "Cut, paste and learn: Surprisingly easy synthesis for instance detection", IEEE International Conference on Computer Vision, Aug. 2017, pp. 1301-1310.
Fang et al., "Instaboost: Boosting instance segmentation via probability map guided copypasting" arXiv: 1908.07801, Aug. 2019, 10 pages.
Ford et al., "Adversarial examples are a natural consequence of test error in noise" arXiv:1901.10513, Jan. 2019, 25 pages.
Gastaldi, "Shake-shake regularization", arXiv: 1705.07485, May 2017, 10 pages.
Girshick et al., "Detectron", Facebook Research, 2018, 5 pages.
Golovin et al., "Google vizier: A service forblack-box optimization", 23rd ACM SIGKDD International Conference on Knowledge Discovery and Data Mining, Aug. 2017, pp. 1487-1495.
Han et al., "Deep pyramidal residual networks" IEEE Conference on Computer Vision and Pattern Recognition, Sep. 2017, pp. 6307-6315.
Hannun et al., "Deep speech: Scaling up end-to-end speech recognition", arXiv: 1412.5567, Dec. 2014, 12 pages.
He et al., "Deep residual learning for image recognition", IEEE Conference on Computer Vision and Pattern Recognition, Jun. 2016, pp. 770-778.
Hershey et al., "Cnn architectures for large-scale audio classification", IEEE International Conference on Acoustics, Speech and Signal Processing, Jan. 2017, pp. 131-135.
Hinton et al., "Deep neural networks for acoustic modeling in speech recognition", IEEE Signal processing magazine, Oct. 2012, pp. 82-97.
Ho et al., "Population based augmentation: Efficient learning of augmentation policy schedules", arXiv:1905.05393, May 2019, 14 pages.

Kanda et al., "Elastic spectral distortion for low resource speech recognition with deep neural networks", IEEE Workshop on Automatic Speech Recognition and Understanding, Dec. 2013, pp. 309-314.
Krizhevsky et al., "Imagenet classification with deep convolutional neural networks", Advances in Neural Information Processing Systems, Dec. 2012, 9 pages.
Krizhevsky et al., "Learning multiple layers of features from tiny images", Technical report, University of Toronto, Apr. 2009, 60 pages.
Lemley et al., "Smart augmentation learning an optimal data augmentation strategy", IEEE Access, Apr. 2017, 5:5858-5869.
Lim et al., "Fast autoaugment", arXiv: 1905.00397, May 2019, 10 pages.
Lin et al., "Focal loss for dense object detection", IEEE International Conference on Computer Vision, Aug. 2017, pp. 2980-2988.
Lin et al., "Microsoft COCO: Common objects in context" European Conference on Computer Vision, May 2014, pp. 740-755.
Liu et al., "Darts: Differentiable architecture search", arXiv: 1806.09055, Jun. 2018, 13 pages.
Liu et al., "Hierarchical representations for efficient architecture search", International Conference on Learning Representations, Feb. 2018, 13 pages.
Liu et al., "Progressive neural architecture search", arXiv: 1712.00559, Dec. 2017, 20 pages.
Liu et al., "SSD: Single shot multibox detector", European Conference on Computer Vision, Sep. 2016, 9905:21-37.
Lopes et al., "Improving robustness without sacrificing accuracy with patch gaussian augmentation", arXiv: 1906.02611, Jun. 2019, 18 pages.
Mun et al., "Generative adversarial network based acoustic scene training set augmentation and selection using svm hyperplane", Detection and Classification of Acoustic Scenes and Events Workshop, Nov. 2017, 5 pages.
Netzer et al., "Reading digits in natural images with unsupervised feature learning", NIPS Workshop on Deep Learning and Unsupervised Feature Learning, Jan. 2011, 9 pages.
Ngiam et al., "StarNet: Targeted computation for object detection in point clouds", arXiv:1908.11069, Dec. 2019, 12 pages.
Park et al., "SpecAugment: A simple data augmentation method for automatic speech recognition" arXiv:1904.08779, Dec. 2019, 6 pages.
Perez et al., "The effectiveness of data augmentation in image classification using deep learning", arXiv:1712.04621, Dec. 2017, 8 pages.
Pham et al., "Efficient neural architecture search via parameter sharing", International Conference on Machine Learning, Feb. 2018, 10 pages.
Ratner et al., "Learning to compose domain-specific transformations for data augmentation", Advances in Neural Information Processing Systems, Sep. 2017, pp. 3239-3249.
Ravuri et al., "Classification accuracy score for conditional generative models", arXiv:1905.10887, May 2019, 15 pages.
Recht et al., "Do imagenet classifiers generalize to imagenet?", arXiv:1902.10811, Jun. 2019, 76 pages.
Sato et al., "Apac:Augmented pattern classification with neural networks", arXiv:1505.03229, May 2015, 9 pages.
Simard et al., "Best practices for convolutional neural networks applied to visual document analysis", Proceedings of International Conference on Document Analysis and Recognition, Aug. 2003, 6 pages.
Sixt et al., "RenderGan: Generating realistic labeled data", arXiv:1611.01331, Nov. 2016, 15 pages.
Snoek et al., "Practical bayesian optimization of machine learning algorithms", Advances in neural information processing systems, Aug. 2012, pp. 2951-2959.
Szegedy et al., "Intriguing properties of neural networks", arXiv:1312.6199, Dec. 2013, 10 pages.
Tan et al., "EfficientNet: Rethinking model scaling for convolutional neural networks", arXiv:1905.11946, May 2019, 10 pages.
Tran et al., "A bayesian data augmentation approach for learning deep models", Advances in Neural Information Processing Systems, Dec. 2017, pp. 2794-2803.

(56) References Cited

OTHER PUBLICATIONS

Wan et al., "Regularization of neural networks using dropconnect", International Conference on Machine Learning, Jun. 2013, 28:1058-1066.
Xie et al., "Unsupervised data augmentation for consistency training", arXiv:1904.12848, Apr. 2019, 21 pages.
Yamada et al., "Shakedrop regularization", arXiv:1802.02375, Feb. 2018, 12 pages.
Yin et al., "A fourier perspective on model robustness in computer vision", arXiv:1906.08988, Jun. 2019, 15 pages.
Zagoruyko et al., "Wide residual networks", British Machine Vision Conference, May 2016, 15 pages.
Zhang et al., "Mixup: Beyond empirical risk minimization", arXiv:1710.09412, Oct. 2017, 13 pages.
Zhong et al., "Random erasing data augmentation", arXiv:1708.04896, Aug. 2017, 10 pages.
Zhu et al., "Data augmentation in emotion classification using generative adversarial networks", arXiv:1711.00648, Nov. 2017, 14 pages.
Zoph et al., "Learning data augmentation strategies for object detection", arXiv:1906.11172, Jun. 2019, 13 pages.
Zoph et al., "Learning transferable architectures for scalable image recognition", Proceedings of IEEE Conference on Computer Vision and Pattern Recognition, Jul. 2017, pp. 8697-8710.
Zoph et al., "Neural architecture search with reinforcement learning", International Conference on Learning Representations, May 2017, 16 pages.

* cited by examiner

TRAINING NEURAL NETWORKS USING DATA AUGMENTATION POLICIES

CROSS-REFERENCE TO RELATED APPLICATION

This application claims priority to U.S. Provisional Application No. 62/909,216, filed on Oct. 1, 2019. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that selects a data augmentation policy for augmenting a training data set. The training data set is used for training a machine learning model to perform a particular machine learning task; for example, the training data set can be a set of images for training a computer vision machine learning model, e.g., an image classification or regression model. A data augmentation policy can be used to increase the quantity and diversity of the training inputs used in training the machine learning model, thereby resulting in the trained machine learning model performing the machine learning task more effectively (e.g., with greater prediction accuracy and better generalization).

The data augmentation policy can define a procedure for transforming a training input in the training data set using a sequence of one or more transformation operations. Using techniques described in this specification, a data augmentation system can quickly and efficiently determine optimal values for one or more hyperparameters of the data augmentation policy that specify, for each training input in the training data set, how to select the transformation operations in the sequence of transformation operations.

The subject matter described in this specification can be implemented in particular embodiments so as to realize one or more of the following advantages.

Some existing systems attempt to learn data augmentation policies by performing a "search phase" before training the machine learning model. During the search phase, the existing systems usually search a large search space of candidate augmentation policies to find a particular candidate augmentation policy. This search phase can often be time-consuming and computationally expensive. Using techniques described in this specification, a data augmentation system can determine an optimal data augmentation policy for training a machine learning model without executing a search phase before the training. Rather, the data augmentation system can determine optimal values for the hyperparameters of the data augmentation policy in parallel with determining other hyperparameters of the machine learning model itself. Furthermore, the data augmentation system can search for optimal values for the hyperparameters in a much smaller search space than some existing systems. For example, in some implementations of the data augmentation system described in this specification, there may only be, e.g., 2, 4, or 6 hyperparameters that must be determined, and the space of possible values for each hyperparameter can be easily discretized. Thus, the search can be significantly quicker and less computationally expensive than existing systems that must search prohibitively large search spaces.

Some such existing techniques attempt to learn an optimal data augmentation policy by training a "toy" or "proxy" machine learning model using multiple candidate data augmentation policies and evaluating the performance of the trained toy machine learning models. The toy machine learning models are usually significantly smaller than the machine learning models that will ultimately be trained using the selected data augmentation policy; e.g., the toy machine learning models can have many fewer parameters than the true machine learning model. Furthermore, the existing systems often train the toy machine learning models by augmenting a toy training data set that is much smaller than the training data set that will ultimately be augmented using the selected data augmentation policy; i.e., the toy training data set has fewer training inputs than the true training data set. Selecting a data augmentation policy based on the performance of small machine learning models trained on a small training data set and then using the data augmentation policy to train a large machine learning model using a large training data set can yield ineffective results, because often the optimal parameters for a data augmentation policy for training a small machine learning model using a small training data set are not the optimal parameters for a data augmentation policy for training a large machine learning model using a large training data set. Using methods described in this specification, a data augmentation system can determine an optimal data augmentation policy for training a machine learning model on a training data set by evaluating the performance of candidate data augmentation policies in training the machine learning model itself using the training data set itself. That is, the data augmentation system is able to evaluate candidate data augmentation policies efficiently even when training the full machine learning model on the full training data set, thus eliminating the need for training toy machine learning models on toy training data sets.

As a particular example, the optimal magnitude of transformation operations of data augmentation policies can grow with both the size of the machine learning model and the size of the training data set. Using some existing techniques, the selected magnitude of the transformation operations might be constant for all machine learning models and all training data sets. The system described in this specification can tune the magnitudes of the transformation operations to the specific machine learning model and the specific training data set. The system can also vary the magnitudes according to a magnitude schedule as training progresses, which is beneficial for larger machine learning models.

In some implementations, using techniques described in this specification, a data augmentation system can learn a data augmentation policy that is transferrable between different training data sets. That is, a data augmentation policy learned with reference to a first training data set can be used to effectively train a machine learning model on a second training data set (i.e., even if the data augmentation policy was not learned with reference to the second training data set). The transferability of the data augmentation policies learned by the data augmentation system can yield significant efficiency gains, as learned data augmentation policies can be re-used on new training data sets without needing to employ additional, computationally intensive search processes to learn a new data augmentation policy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
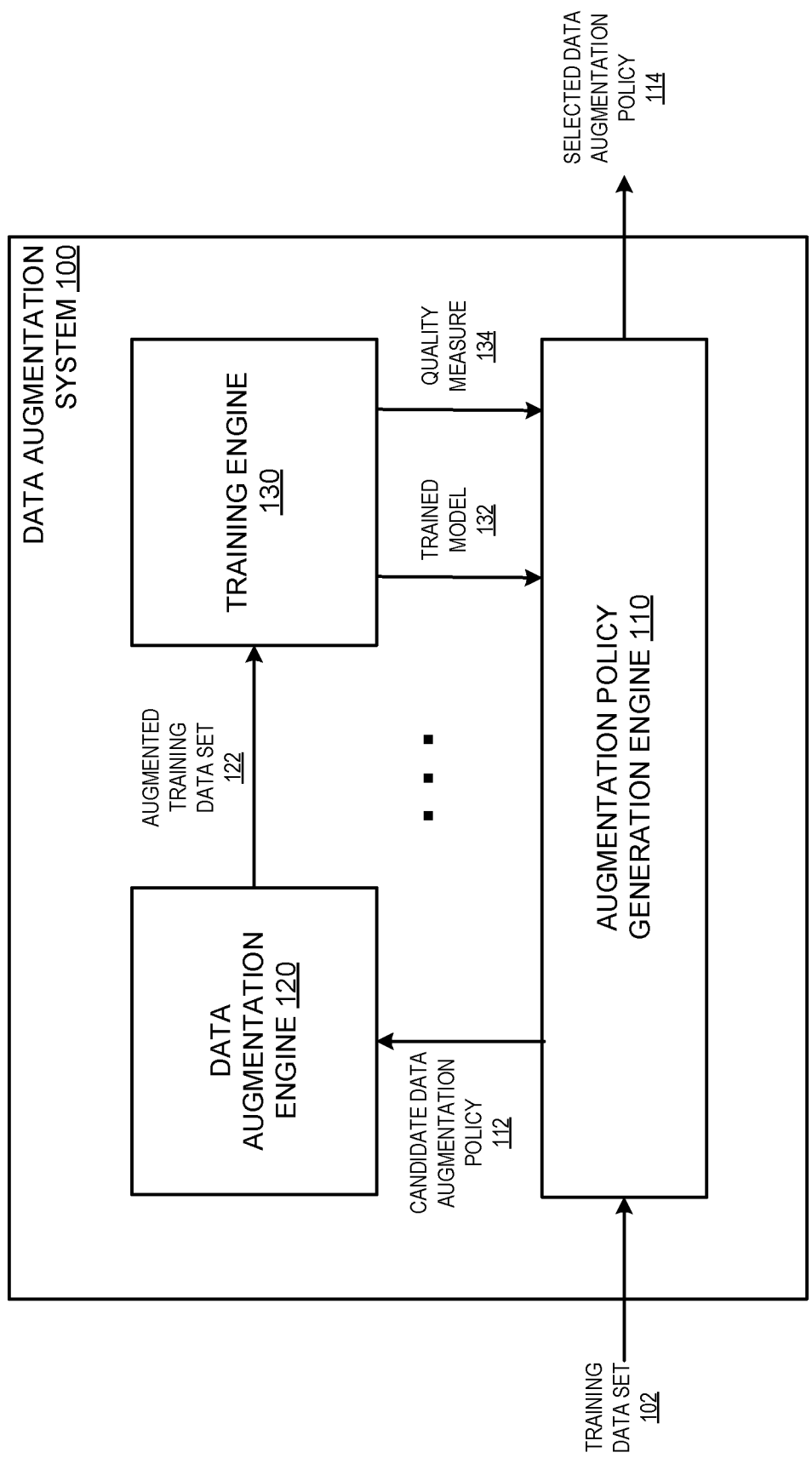
FIG. 1 is a diagram of an example data augmentation system.

This specification describes a system that generates a data augmentation policy for training a machine learning model on a training data set.

For example, the machine learning task may be a speech recognition task, where the machine learning model is configured to process a representation of an audio waveform to generate an output that characterizes a sequence of phonemes, characters, or words corresponding to the audio waveform.

As another example, the machine learning task may be a video analysis task, where the machine learning model is configured to process a sequence of video frames to generate an output that characterizes the video frames, e.g., by characterizing whether the video frames depict a person performing a particular action.

As another example, the machine learning task may be a natural language processing task, where the machine learning model is configured to process a portion of text to generate an output that characterizes the portion of text, e.g., by characterizing a translation of the portion of text into a different natural language.

As another example, the machine learning task may be an image processing task, where the machine learning model is configured to process an input that includes an image to generate a corresponding output, e.g., a classification output, a regression output, or a combination thereof.

As a particular example, the machine learning model can be configured to process an image to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or in the winter), and the image may belong to the category if it has the global property corresponding to the category.

As another particular example, the machine learning model can be configured to process an image to generate a pixel-level classification output that includes, for each pixel, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the machine learning model can be configured to process an image to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box.

A data augmentation policy can specify a procedure for augmenting a training data set that will be used to train the machine learning model. That is, the data augmentation policy can increase the number and diversity of training inputs in the training data set in order to train the machine learning model to be more accurate and/or robust. For each of one or more training inputs in the training data set, a data augmentation system can select a sequence of one or more transformation operations to transform the training input, generating a transformed training input that is added to the training data set. Each transformation operation in the sequence can be selected from a set of candidate transformation operations.

As a particular example, each training input in the training data set might include an image. The set of candidate transformation operations for transforming an image in the training data set might include one or more of: a rotation operation that rotates the image; a posterizing operation that posterizes the image; a sharpness operation that changes the blurriness of the image; a translation operation that translates the pixels of the image horizontally and/or vertically; an auto-contrast operation that maximizes the image contrast of the image; a contrast operation that changes the color contrast of the image; solarization operation that adds a solarization effect to the image; a shearing operation that shears the pixels of the image horizontally and/or vertically; a color operation that changes the color of the image; a brightness operation that changes the brightness of the image; a flipping operation that flips the pixels in the image horizontally and/or vertically; a scale jittering operation that changes a scale of the image; an equalization operation that performs histogram equalization on the image; or a random cropping operation that randomly crops the image. The set of candidate transformation operations might also include an identity operation that does not alter the image. In some cases, it can facilitate training of the machine learning model to provide transformed training examples that are less distorted than other training transformed training examples, i.e., have been processed by fewer transformation operations. This can help avoid over-regularization, i.e., underfitting the training data set.

In some implementations, the transformed training input can be associated with the same ground-truth label as the training input from which it was generated. That is, a machine learning model that is configured to process training inputs and generate predicted labels can be trained to generate the same predicted label when it processes the transformed training input as when it processes the original training input.

In some implementations, the ground-truth label of a training input can also be transformed when the training input is transformed, and the transformed ground-truth label can be associated with the corresponding transformed training input. The transformation of the ground-truth label of a training input can be determined from the transformation operation with which the training input is processed. As a particular example, the training input might be an image and the ground-truth label might include identifications of objects depicted in the image. In this case, when the image is transformed, e.g., by cropping a portion of the image, the ground-truth label corresponding to the image can also be transformed to match the new transformed image, e.g., by removing identifications of objects that were depicted in the cropped portion of the image, and thus are no longer depicted in the transformed image.

FIG. 1 is a diagram of an example data augmentation system 100.

The data augmentation system 100 is an example of a system implemented as computer programs on one or more computers in one or more locations, in which the systems, components, and techniques described below can be implemented.

The data augmentation system 100 is configured to receive a training data set 102 that includes multiple training inputs and select a particular data augmentation policy 114 for augmenting the training data set 102 to train a machine learning model to perform a machine learning task. More specifically, the data augmentation system 100 can determine optimal values for one or more hyperparameters of the data augmentation policy 114, i.e., values for one or more hyperparameters that define the data augmentation policy 114.

The data augmentation system 100 includes an augmentation policy generation engine 110, a data augmentation engine 120, and a training engine 130.

The augmentation policy generation engine 110 can receive the training data 102 and generate a candidate data augmentation policy 112 for the training data 102. The augmentation policy generation engine 110 can generate the candidate data augmentation policy 112 by selecting values for each hyperparameter in a set of hyperparameters of the candidate data augmentation policy 112. The hyperparameters can define a procedure for selecting, for each training input in the training data set 102, one or more transformation operations in a sequence of transformation operations for transforming the training input. The process for selecting a sequence of transformation operations is described in more detail below in reference to FIG. 2.

The data augmentation engine 120 can receive the candidate data augmentation policy 112 and process the training data set 102 using the candidate data augmentation policy 112 to generate an augmented training data set 122. The augmented training data set 122 can include i) original training inputs from the training data set 102 and ii) transformed training inputs, where each transformed training input has been generated by the data augmentation engine 120 by processing a respective training input from the training data set 102 in accordance with the candidate data augmentation policy 112.

In some implementations, each transformed training input in the augmented training data set 122 can be associated with the same ground-truth label as the original training input that the data augmentation engine 120 processed to generate the transformed training input. In some other implementations, the ground-truth labels corresponding to training input can also be transformed when the training input is transformed. Each transformation operations can specify how the ground-truth label will be transformed, in addition to specifying how the training input will be transformed.

The data augmentation engine 120 can provide the augmented training data set 122 to the training engine 130, which generates a trained model 132 by training the machine learning model to perform the machine learning task using the augmented training data set. That is, the training engine 130 can process transformed training inputs and original training inputs in the augmented training data set using current values for the parameters of the machine learning model to generate a respective training output for each training input. The training engine 130 can determine an error in the training output based on the ground-truth output for the corresponding training input, and generate a parameter update for the parameters of the machine learning model using the determined error.

In some implementations, the data augmentation engine 120 applies the candidate data augmentation policy 112 to the entire training data set 102, and provides the augmented training data set 122 to the training engine 130 in a single batch. In some other implementations, the data augmentation engine 120 can sample a batch of training inputs from the training data set 102, generate a batch of the augmented training data set 122 from the sampled batch of the training data set 102, and provide the batch of the augmented training data set 122 to the training engine 130, which the training engine 130 can use to update the parameters of the machine learning model. Then, the data augmentation engine 120 can repeat this process one or more times, iteratively providing batches of the augmented training data set 122 to the training engine 130. This process is described in more detail below in reference to FIG. 2.

The training engine 130 can also determine a quality measure 134 of the trained model 132 that represents a performance of the trained model 132 on the machine learning task.

For example, the training engine 130 can determine a performance measure of the trained model 132 on the machine learning task by using the trained model 132 to process a validation data set that includes training inputs that were not used by the training engine 130 during training of the trained model 132. The training engine can then determine the quality measure of the trained model 132 using the performance measure of the trained model 132, e.g., by determining the quality measure to be equal to the performance measure or by using the performance measure as one of multiple inputs to the quality measure. The training inputs of the validation data set can include i) original training inputs from the training data set 102 and ii) transformed training inputs, where the training inputs of the validation data were held out during training of the trained model 132. As a particular example, the training engine 130 can train the trained model 132 using cross-validation, e.g., k-fold cross validation, and determine the performance measure 134 of the trained model 132 to be the average accuracy of the trained model 132 on the held-out validation set.

The training engine 130 can provide the trained model 132 and the quality measure 134 of the trained model 132 to the augmentation policy generation engine 130.

The data augmentation system 100 can perform the process described above multiple times for different respective candidate data augmentation policies 112. For each candidate data augmentation policy 112, the augmentation policy generation engine 110 selects a different set of hyperparameters. The process for selecting different candidate data augmentation policies 112 is described in more detail below in reference to FIG. 3.

The values for the set of hyperparameters of each candidate data augmentation policy 112 can be selected from a relatively small search space; for example, there may be only 2, 4, or 10 hyperparameters in the set of hyperparameters, and the space of possible values for each hyperparameter can be easily discretized. Thus, the augmentation policy generation system 110 may only need to perform the above process relatively few times, e.g., 5, 10, 20, 50, or 100 times, in order to final an optimal data augmentation policy.

In some implementations, the augmentation policy generation system 110 can select the next candidate data augmentation policy 112 using the quality measure 134 corresponding to the previous candidate data augmentation policy 112. For example, if the quality measure 134 represents an error of the trained model 132 on training inputs, then the data augmentation policy can determine an update to the values for the hyperparameters of the previous candidate data augmentation policy, e.g., using backpropagation. That is, the training engine 130 can process the transformed training inputs in the augmented training data set 122 using the machine learning model to generate respective training outputs, and determine an error for each training output. The augmentation policy generation engine 110 can then generate an update for the hyperparameters of the candidate data augmentation policy 112 using the errors. This process is described in more detail below in reference to FIG. 2.

The augmentation policy generation engine 110 can determine a quality measure for each trained model 132 that was trained using a respective candidate data augmentation policy 112. The augmentation policy generation engine 110 can select a particular candidate data augmentation policy that optimizes the performance of the machine learning model using the respective quality measures of the trained models 132. For example, the augmentation policy generation system can determine the selected data augmentation policy 114 to be the candidate data augmentation policy corresponding to the trained model 132 with the highest quality measure.

In some implementations, the trained model 132 that was trained using the selected data augmentation policy 114 can be provided to an external system that uses the trained model 132 to perform the machine learning task. That is, the trained model 132 can be deployed without further training.

In some other implementations, the data augmentation system 100 or an external system can use the selected data augmentation policy 114 to further train the machine learning model to perform the machine learning task. For example, the external system or the data augmentation system 100 can use the trained parameters of the trained model 132 as a starting point for the training; that is, the external system determines further parameter updates for the trained model 132. As another example, the external system can train a new machine learning model using the selected data augmentation policy 114, i.e., begin the training from scratch. In some implementations, when further training the machine learning model, the external system can use the selected data augmentation policy 114 to further augment the training data set 102. Instead or in addition, the external system can use the selected data augmentation policy 114 to augment a different training data set.

In some implementations, the augmentation policy generation engine 110 can be a component of a larger hyperparameter selection engine that selects all of the hyperparameters of the machine learning model, where the hyperparameters of the data augmentation policy are treated as hyperparameters of the machine learning model itself. That is, each candidate data augmentation policy 112 can be a component of a candidate set of hyperparameter values. In these implementations, the training engine 130 can determine, for each candidate set of hyperparameter values, a quality measure 134 of a trained machine learning model 132 that each trained using the candidate set of hyperparameter values. The hyperparameter selection engine can then determine a particular candidate set of hyperparameter values that corresponds to the highest quality measure, and select the particular candidate set as the final set of hyperparameter values for the machine learning model. In this case, the selected data augmentation policy 114 would include the values of the data augmentation hyperparameters that were included in the final set of hyperparameter values. Thus, the selected data augmentation policy 114 can be selected in conjunction with other hyperparameters of the machine learning model, instead of being selected during a separate search phase before the hyperparameters of the machine learning model are selected. Eliminating the separate search phase for the data augmentation policy can save significant time and computational resources.

Figure 2:
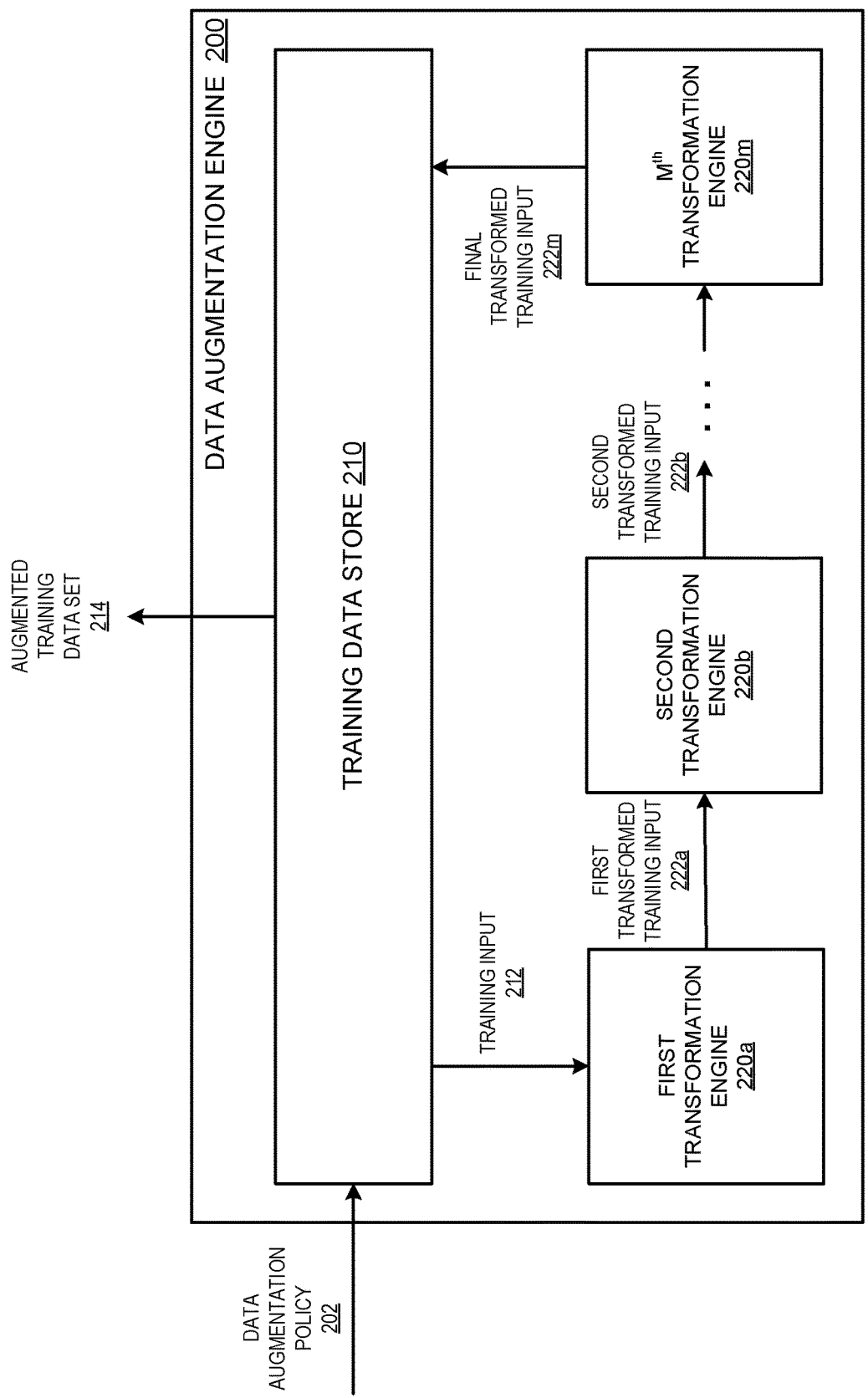
FIG. 2 is a diagram of an example data augmentation engine.

FIG. 2 is a diagram of an example data augmentation engine 200. The data augmentation engine 200 is an example of a system implemented as computer programs on one or more computers in one or more locations, in which the systems, components, and techniques described below can be implemented.

The data augmentation engine 200 is configured to receive a data augmentation policy 202, e.g., the candidate data augmentation policy 112 depicted in FIG. 1, and generate an augmented training data set 214 by using the data augmentation policy 202 to augment a training data set that includes multiple training inputs. The data augmentation engine 200 includes a training data store 210 that stores the training inputs of the training data set.

The data augmentation engine 200 can provide the augmentation training data set 214 to a training engine, e.g., the training engine 130 depicted in FIG. 1, that can train a machine learning model on a machine learning task using the augmented training data set 214.

In some implementations, the data augmentation engine 200 can provide the augmented training data set 214 to the training engine in a single batch. The training engine can then train the machine learning model using the augmented training data set 214 without further interaction with the data augmentation engine 200.

In some other implementations, the data augmentation engine 200 can generate multiple batches of the augmented training data set 214 and provide each batch to the training engine at a respective different training time period. In some such implementations, the data augmentation policy 202 can define a different procedure for generating transformed training inputs for each training time period.

The data augmentation policy 202 can include a respective value for each hyperparameter in a set of hyperparameters that defines a procedure for selecting, for each of multiple training inputs in the training data store 210, a sequence of transformation operations for processing the training input to generate a transformed training input. In particular, the data augmentation policy 202 can define, for each position in each sequence of transformation operations, a procedure for selecting a transformation operation from a set of candidate transformation operations.

The set of hyperparameters can include a first hyperparameter that specifies the length of the sequence of transformation operations corresponding to each training input. Generally, each training input can be transformed using the same number of transformation operations. That is, the first hyperparameter can specify a single sequence length that applies to each transformed training input.

The set of hyperparameters can also include one or more second hyperparameters that specify a magnitude schedule for determining a magnitude for each transformation operation in the sequence of transformation operations corresponding to each training input. Generally, each transformation operation in a sequence of transformation operations can have a magnitude associated with it, and so selecting a transformation operation for the sequence of transformation operations includes selecting a magnitude for the transformation operation. Each candidate transformation operation can have a range of possible magnitudes. In some implementations, the range of magnitudes for each candidate transformation operation can be normalized to be within a common range, e.g., an integer between 0 and 10, so that selecting a magnitude for any candidate transformation operation includes selecting a value from the same range of magnitudes.

As a particular example, if the training input is an image and the transformation operation is a rotation operation, then the magnitude might indicate how much to rotate the image; e.g., a magnitude of 5 might indicate a rotation of 90°.

The one or more second hyperparameters can specify a single magnitude schedule that the data augmentation engine 200 can use to select the magnitude for each selected transformation operation in each sequence of transformation operations corresponding to a respective training input.

In some implementations, each magnitude is constant; that is, each transformation operation in each sequence of transformation operations has the same fixed magnitude. In these implementations, the magnitude schedule can be defined by a single second hyperparameter.

In some other implementations, each magnitude is randomly selected; that is, for each position of each sequence of transformation operations, the data augmentation system 200 randomly samples the magnitude of the corresponding transformation operation from a range of possible magnitudes. In these implementations, the magnitude schedule can be defined by two values: a first value that specifies the minimum magnitude for transformation operations and a second value that specifies the maximum magnitude for transformation operations.

In some other implementations, the magnitude schedule specifies a different procedure for selecting magnitudes for each of multiple training time periods. As described above, the training engine can train the machine learning model across multiple training time periods. During each training time period, the training engine trains the machine learning model using a batch of the augmented training data set 214 that has been augmented using transformation operations that have magnitudes selected according to the respective training time period. Thus, when selecting a sequence of transformation operations for generating a transformed training input, the data augmentation engine 200 determines the particular training time period of the multiple training time periods during which the transformed training input will be processed by the machine learning model. Then, the data augmentation engine 200 selects a magnitude for each transformation operation in the sequence of transformation operations according to the magnitude schedule and the particular training time period.

In some such implementations, the magnitude is constant for each training time period, and linearly increases with the training time periods. That is, the magnitude schedule can be defined by two values: a first value that specifies the magnitude of all transformation operations in the first training time period, and a second value that specifies an amount by which the magnitude of transformation operations will change in each subsequent training time periods, i.e., a slope of the magnitudes. Increasing the magnitudes of transformation operations as training progresses can be effective because the optimal transformation operation magnitude generally increases as training progresses.

In some other such implementations, each magnitude is randomly selected from a range of possible magnitudes that corresponds to the training time period. That is, when generating a transformed training input corresponding to a particular training time period, the data augmentation engine 200 randomly samples a magnitude for each transformation operation from the range of possible magnitudes corresponding to the particular training time period. In some such implementations, the range corresponding to each training time period has the same lower bound, but the upper bound of ranges linearly increases with the training time periods. That is, the magnitude schedule is defined by three values: a first value that specifies the minimum magnitude for transformation operations in each training time period, a second value that specified a maximum magnitude for transformation operations in the first training time period, and a third value that specifies an amount by which the maximum magnitude of transformation operations will change in each subsequence training time period, i.e., a slope of the upper bounds of the magnitudes.

The set of hyperparameters can include one or more third hyperparameters that specify the probabilities with which the data augmentation engine 200 will select each candidate transformation operation for each position in the sequences of transformation operations selected for transforming training inputs. That is, for each particular transformation operation and for each particular position in a fixed-length sequence of transformation operations for training inputs, the data augmentation policy 202 can specify a probability that the data augmentation engine will select the particular transformation operation at the particular position when generating a sequence of transformation operations for transforming a respective training input. Each third hyperparameter can apply to each training input; i.e., a given transformation operation is selected for a given position in the sequence with same the probability for each transformed training input.

In some implementations, the data augmentation engine 200 selects each of the transformation operations with equal probability in each of the positions in the sequence. That is, if there are N candidate transformation operations, the data augmentation engine 200 selects each candidate transformation operation with probability $$\frac{1}{N}$$

for each position of each fixed-length sequence of transformation operations.

In some other implementations, each candidate transformation operation is assigned a different probability of being selected that is the same for all positions of the fixed-length sequences of transformation operations. That is, regardless of the position of the sequence, the data augmentation engine 200 selects a particular candidate transformation operation with a fixed probability that is different from one or more other probabilities corresponding to other candidate transformation operations.

In some other implementations, the data augmentation policy 202 includes a different probability for each candidate transformation operation and for each position in the fixed-length sequences of transformation operations. That is, if there are N candidate transformation operations and M positions in the fixed-length sequence, then there are M×N different probabilities.

In some implementations, each third hyperparameter is machine-learned. In these implementations, each transformation operation has a respective selection parameter for each position in the sequence of transformation operations. As a particular example, if there are 10 candidate transformation operations and the length of each sequence of transformation operations is 3, then there are 30 total selection parameters. When selecting a transformation operation for a given position in a sequence of transformation operations for transforming a particular training input, the data augmentation engine 200 applies a softmax function to each selection parameter that corresponds to the given position, generating a respective selection probability for each candidate transformation operation. The data augmentation engine 200 can then select a candidate transformation operation for the position according to the respective selection probabilities, and generate a transformed training input from the particular training input and provide the transformed training input to the training engine. The training engine can then process the transformed training input and generate a parameter update for each third hyperparameter. The updated values for the third hyperparameters can be included in a next data augmentation policy 202 that is received by the data augmentation engine at a future time for augmenting the training data set according to the next data augmentation policy 202.

Referring back to FIG. 2, the data augmentation engine 200 can include M transformation engines 220*a-m*. Each transformation engine 220*a-m* can correspond to a position in the fixed-length sequences of transformation operations for transforming respective training inputs. That is, in this case the first hyperparameter of the data augmentation policy 202 specifies that each sequence of transformation operations will have length M, so that each of the M transformation engines 220*a-m* corresponds to a different position.

The training data store 210 can select a training input 212 from the training data set and provide the training input 212 to the first transformation engine 220*a*. The data augmentation engine 200 selects a transformation operation from the set of candidate transformation operations according to the probabilities specified by the data augmentation policy 202, and determines a magnitude for the selected transformation operation according to the magnitude schedule of the data augmentation policy. The first transformation engine 220*a* can then process the training input 212 using the selected transformation operation and determined magnitude, to generate a first transformed training input 222*a*.

The first transformation engine 220*a* can provide the first transformed training input 222*a* to the second transformation engine 220*b*. The data augmentation engine 200 can again select a candidate transformation operation and determine a magnitude according to the data augmentation policy 202, and the second transformation engine 220*b* can process the first transformed training input 222*a* using the selected transformation operation and determined magnitude to generate a second transformed training input 222*b*.

This data augmentation engine 200 can continue this process until the/IP transformation engine 220*m* generates a final transformed training input 222*m*. The data augmentation engine 200 can add the final transformed training input 222*m* to the augmented training data set 214 in the training data store. That is, the augmented training data set 214 can include both the training input 212 and the final transformed training input 222*m* that was generated from the training input 212.

In some implementations, the data augmentation engine 200 can generate a respective transformed training input from each training input in the original training data set. In some other implementations, the data augmentation engine 200 can generate multiple transformed training inputs from each training input in the original data set. Because the data augmentation engine 200 can select a different sequence of transformation operations each time it processes a training input, each transformed training input corresponding to the same training input can be different.

Figure 3:
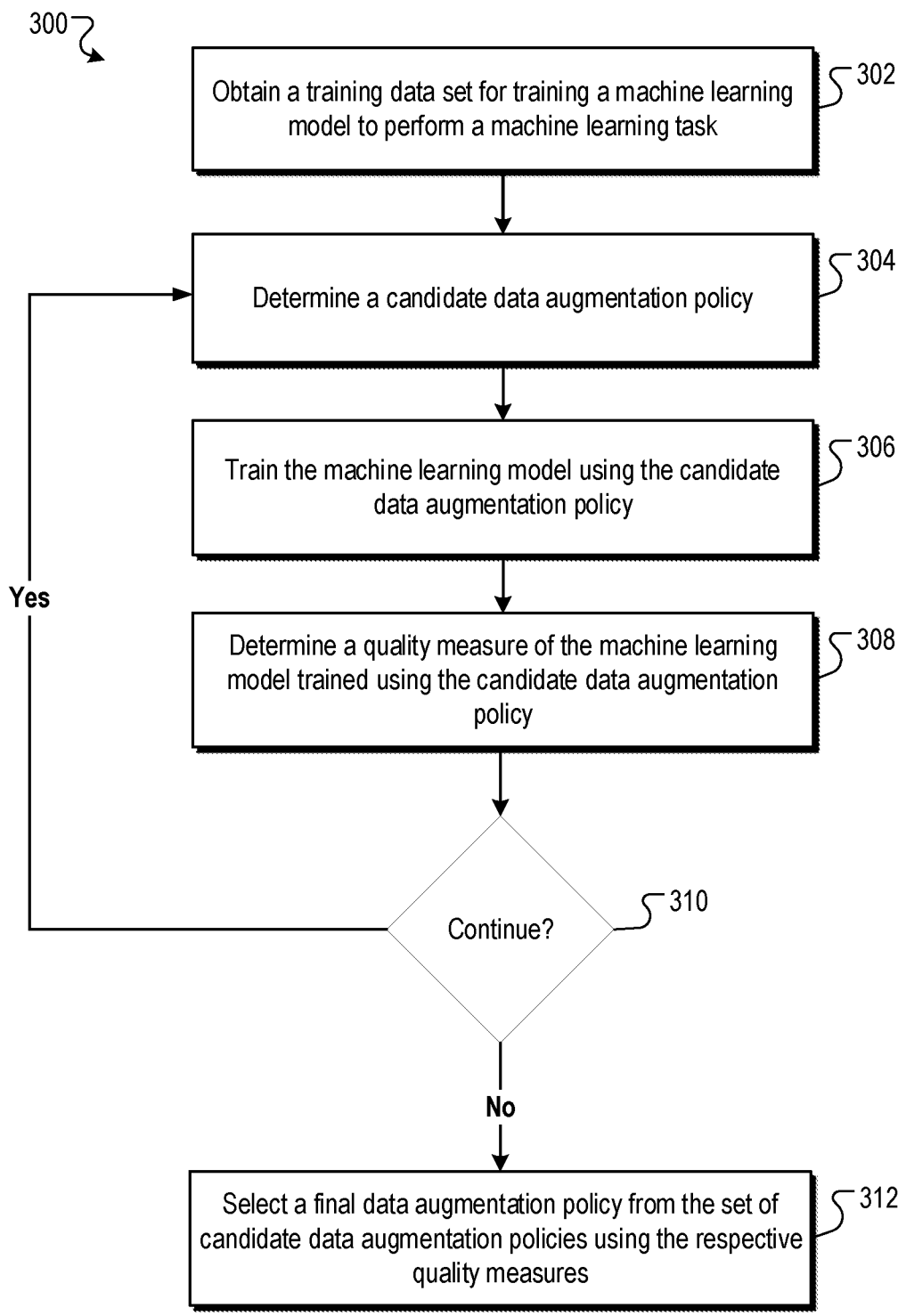
FIG. 3 is a flow diagram of an example process for generating a data augmentation policy.

FIG. 3 is a flow diagram of an example process 300 for generating a data augmentation policy. For convenience, the process 300 will be described as being performed by a system of one or more computers located in one or more locations. For example, a data augmentation system, e.g., the data augmentation system 100 depicted in FIG. 1, appropriately programmed in accordance with this specification, can perform the process 300.

The system obtains a training data set for training a machine learning model to perform a machine learning task (step 302). The training data set can include multiple training inputs. The machine learning model has multiple parameters.

The system determines a candidate data augmentation policy (step 304). The candidate data augmentation policy defines a procedure for processing a training input to generate a transformed training input. The procedure includes selecting a sequence of one or more transformation operations to be applied to the training input. The system can determine the candidate data augmentation policy by i) determining a value for a first hyperparameter that specifies the same number of transformation operations that will be in each sequence of transformation operations and ii) determining a respective value for each of one or more second hyperparameters that specify the same magnitude schedule for determining the magnitude for each transformation operation in each sequence of transformation operations.

The system trains the machine learning model using the candidate data augmentation policy (step 306). The system can determine an augmented training data set by processing the training inputs in the training data set to generate transformed training inputs in accordance with the candidate data augmentation policy. The system can then process one or more particular transformed training inputs in the augmented training data set using current values for the multiple network parameters of the machine learning model to generate respective training outputs. The system can generate a parameter update for the parameters of the machine learning model based on an error in the training output.

The system determines a quality measure of the machine learning model trained using the candidate data augmentation policy (step 308). The quality measure of the machine learning model represents a performance of the machine learning model on the machine learning task as a result of training the machine learning model using the candidate data augmentation policy.

The system determines whether to generate and evaluate another candidate data augmentation policy (step 310). If the system determines to continue and generate another candidate data augmentation policy, the system returns to step 304.

In some implementations, the system can generate a predetermined number of candidate augmentation policies. For example, the system can search the space of possible values for the hyperparameters of the data augmentation policy using a grid search. That is, the system can determine, for each hyperparameter, a set of predetermined possible values for the hyperparameter. The system can then generate a respective candidate data augmentation policy for each combination of possible values for the hyperparameters. As a particular example, if there are three hyperparameters and three possible values for each hyperparameter, the system would generate 27 candidate data augmentation policies. As another particular example, if there are two hyperparameters and five possible values for each hyperparameter, the system would generate 25 candidate data augmentation policies.

In some other implementations, e.g., the implementations in which the hyperparameters of the data augmentation policy are machine-learned, the system might determine not to continue generating candidate data augmentation policies if the quality measures of the corresponding trained models stop improving. That is, after training the machine learning model using each candidate training policy, the system can determine an update to the values of the hyperparameters. The update is determined in order to improve a performance measure of the machine learning model, e.g., the prediction accuracy of the machine learning model. If the rate at which the machine learning model improves, according to a performance measure, flattens or stops declines, then the system might determine not to generate more candidate data policies.

As other particular examples, the system might use random search, Bayesian optimization, or evolutionary optimization to search for optimal values of the hyperparameters of the data augmentation policy. Each of these approaches has a respective mechanism for determining when to stop searching the space of hyperparameters.

If the system determines not to generate another candidate data augmentation policy, the system selects a final data augmentation policy from the set of candidate data augmentation policies using the respective quality measures (step 312). For example, the system can select the candidate data augmentation policy corresponding to the highest quality measure.

Each training input can each be processed with a different sequence of transformation operations, but each sequence of transformation operations has the same number of transformation operations, and each transformation operation in all of the sequences has a magnitude that is determined according to the same magnitude schedule. The procedure for transforming a given training input can include randomly selecting a transformation operation for each position in the sequence, and then transforming the training input using the selected sequence of transformation operations in the order defined by the sequence.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining a training data set for training a machine learning model having a plurality of network parameters to perform a particular machine learning task, the training data set comprising a plurality of training inputs;
determining a plurality of data augmentation policies, wherein each data augmentation policy defines a procedure for processing a training input to generate a transformed training input, wherein the procedure comprises selecting a sequence of one or more transformation operations to be applied to the training input, and wherein the determining comprises, for each data augmentation policy:
determining a value for a first hyperparameter that specifies a same number of transformation operations in each sequence of transformation operations selected for transforming a respective training input, and
determining a respective value for each of one or more second hyperparameters, wherein the second hyperparameters specify a same magnitude schedule for determining a magnitude for each transformation operation in each sequence of transformation operations selected for transforming a respective training input;
for each data augmentation policy, training the machine learning model using the data augmentation policy, comprising:
determining an augmented training data set by processing the training inputs in the training data set to generate transformed training inputs in accordance with the data augmentation policy, processing a particular transformed training input in the augmented training data set using current values for the plurality of network parameters of the machine learning model to generate a training output, and generating a parameter update for the plurality of parameters of the machine learning model based on an error in the training output;

determining, for each data augmentation policy, a quality measure of the machine learning model that has been trained using the data augmentation policy, wherein the quality measure of the machine learning model represents a performance of the machine learning model on the particular machine learning task as a result of training the machine learning model using the data augmentation policy; and selecting a final data augmentation policy based using the quality measures of the machine learning models.

Embodiment 2 is the method of embodiment 1, further comprising:

providing the machine learning model that was trained using the selected final data augmentation policy as a final trained machine learning model for the particular machine learning task.

Embodiment 3 is the method of embodiment 1, further comprising:

augmenting the training data set according to the final data augmentation policy to generate a final augmented training data set; and training the machine learning model on the final augmented training data set.

Embodiment 4 is the method of any one of embodiments 1-3, wherein the magnitude schedule is defined by a single second hyperparameter that specifies a fixed magnitude throughout training.

Embodiment 5 is the method of any one of embodiments 1-3, wherein the second hyperparameters comprise:

a first value that specifies the magnitude of transformation operations in a first training time period, and a second value that specifies an amount by which the magnitude of transformation operations will change in one or more subsequent training time periods.

Embodiment 6 is the method of any one of embodiments 1-3, wherein:

the second hyperparameters comprise i) a first value that specifies a minimum magnitude of transformation operations, and ii) a second value that specifies a maximum magnitude of transformation operations; and processing a training input to generate a transformed training input comprises, for each transformation operation in the sequence of transformation operations selected for transforming the training input, randomly sampling a magnitude for the transformation operation from a range of magnitudes defined by the minimum magnitude and the maximum magnitude.

Embodiment 7 is the method of any one of embodiments 1-3, wherein:

the second hyperparameters comprise i) a first value that specifies a minimum magnitude of transformation operations, ii) a second value that specifies a maximum magnitude of transformation operations in a first training time period, and iii) a third value that specifies an amount by which the maximum magnitude of transformation operations will change in one or more subsequent training time periods; and processing a training input to generate a transformed training input in a given training time period comprises, for each transformation operation in the sequence of transformation operations selected for transforming the training input, randomly sampling a magnitude for the transformation operation from a range of magnitudes defined by the minimum magnitude and the maximum magnitude corresponding to the given training time period.

Embodiment 8 is the method of any one of embodiments 1-7, wherein each transformation operation in each sequence of transformation operations is selected from a plurality of candidate transformation operations.

Embodiment 9 is the method of embodiment 8, wherein the training inputs are images and wherein the plurality of candidate transformation operations comprise one or more of: a rotation operation; a posterizing operation; a sharpness operation; a translation operation; an auto-contrast operation; a contrast operation; a solarization operation; a shearing operation; a color operation; a brightness operation; a flipping operation; a scale jittering operation; an equalization operation; an identity operation; or a random cropping operation.

Embodiment 10 is the method of any one of embodiments 8-9, wherein determining a plurality of data augmentation policies further comprises, for each data augmentation policy:

determining, for each candidate transformation operation of the plurality of candidate transformation operations, a respective value for each of one or more third hyperparameters, wherein:

each third hyperparameter corresponds to a different particular position in the sequences of transformation operations selected for transforming training inputs; and the third hyperparameter corresponding to a particular position in the sequences of transformation operations specifies a probability that the candidate transformation operation is selected as the transformation operation at the particular position in the sequence of transformation operations selected for transforming a particular input.

Embodiment 11 is the method of embodiment 10, wherein each candidate transformation operation is selected with a same probability in each position in the sequences of transformation operations selected for transforming training inputs.

Embodiment 12 is the method of embodiment 10, wherein, for each candidate transformation operation, the candidate transformation operation is selected with a same probability in each position in the sequences of transformation operations selected for transforming training inputs.

Embodiment 13 is the method of embodiment 10, wherein:

the third hyperparameters are machine learned and comprise a respective selection parameter for each candidate transformation operation for each position in the sequences of transformation operations selected for transforming training inputs, and training a machine learning model using a particular data augmentation policy comprises, for a given training input:

for each position in the sequence of transformation operations selected for transforming the given training input:

processing the respective selection parameter of the position corresponding to each candidate transformation operation using a softmax layer to generate a respective selection probability for each candidate transformation operation, and selecting a transformation operation for the position in accordance with the respective selection probabilities;

processing the given training input to generate a transformed training input in accordance with the selected sequence of transformation operations;

processing the transformed training input using the machine learning model to generate a training output; and adjusting current values of the selection parameters based on an error in the training output.

Embodiment 14 is the method of any one of embodiments 1-13, wherein determining a quality measure of a machine learning model that has been trained using a data augmentation policy comprises:

determining a performance measure of the machine learning model on the particular machine learning task using validation data comprising a plurality of training inputs;

determining the quality measure based on the performance measure.

Embodiment 15 is the method of any one of embodiments 1-14, wherein selecting the final data augmentation policy based on the quality measures of the machine learning models comprises selecting the determined data augmentation policy having the highest quality measure.

Embodiment 16 is the method of any one of embodiments 1-15, wherein the training inputs are images and the particular machine learning task is an image processing task comprising classification or regression.

Embodiment 17 is a system comprising one or more computers and one or more storage devices storing instructions that are operable, when executed by the one or more computers, to cause the one or more computers to perform the operations of any one of embodiments 1-16.

Embodiment 18 is one or more non-transitory computer storage media encoded with computer program instructions that when executed by a plurality of computers cause the plurality of computers to perform the operations of any one of embodiments 1-16.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining a training data set for training a machine learning model having a plurality of network parameters to perform a particular machine learning task, the training data set comprising a plurality of training inputs;

determining a plurality of data augmentation policies, wherein each data augmentation policy defines a procedure for processing a training input to generate a transformed training input, wherein the procedure comprises selecting a sequence of one or more transformation operations to be applied to the training input, and wherein the determining comprises, for each data augmentation policy:

determining a value for a first hyperparameter that specifies a same number of transformation operations in each sequence of transformation operations selected for transforming a respective training input, and determining a respective value for each of one or more second hyperparameters, wherein the second hyperparameters specify a same magnitude schedule for determining a magnitude for each transformation operation in each sequence of transformation operations selected for transforming a respective training input;

for each data augmentation policy, training the machine learning model using the data augmentation policy, comprising:

determining an augmented training data set by processing the training inputs in the training data set to generate transformed training inputs in accordance with the data augmentation policy, processing a particular transformed training input in the augmented training data set using current values for the plurality of network parameters of the machine learning model to generate a training output, and generating a parameter update for the plurality of parameters of the machine learning model based on an error in the training output;

determining, for each data augmentation policy, a quality measure of the machine learning model that has been trained using the data augmentation policy, wherein the quality measure of the machine learning model represents a performance of the machine learning model on the particular machine learning task as a result of training the machine learning model using the data augmentation policy; and selecting a final data augmentation policy based using the quality measures of the machine learning models.

2. The method of claim 1, further comprising:
providing the machine learning model that was trained using the selected final data augmentation policy as a final trained machine learning model for the particular machine learning task.

3. The method of claim 1, further comprising:
augmenting the training data set according to the final data augmentation policy to generate a final augmented training data set; and
training the machine learning model on the final augmented training data set.

4. The method of claim 1, wherein the magnitude schedule is defined by a single second hyperparameter that specifies a fixed magnitude throughout training.

5. The method of claim 1, wherein the second hyperparameters comprise:
a first value that specifies the magnitude of transformation operations in a first training time period, and
a second value that specifies an amount by which the magnitude of transformation operations will change in one or more subsequent training time periods.

6. The method of claim 1, wherein:
the second hyperparameters comprise i) a first value that specifies a minimum magnitude of transformation operations, and ii) a second value that specifies a maximum magnitude of transformation operations; and
processing a training input to generate a transformed training input comprises, for each transformation operation in the sequence of transformation operations selected for transforming the training input, randomly sampling a magnitude for the transformation operation from a range of magnitudes defined by the minimum magnitude and the maximum magnitude.

7. The method of claim 1, wherein:
the second hyperparameters comprise i) a first value that specifies a minimum magnitude of transformation operations, ii) a second value that specifies a maximum magnitude of transformation operations in a first training time period, and iii) a third value that specifies an amount by which the maximum magnitude of transformation operations will change in one or more subsequent training time periods; and
processing a training input to generate a transformed training input in a given training time period comprises, for each transformation operation in the sequence of transformation operations selected for transforming the training input, randomly sampling a magnitude for the transformation operation from a range of magnitudes defined by the minimum magnitude and the maximum magnitude corresponding to the given training time period.

8. The method of claim 1, wherein each transformation operation in each sequence of transformation operations is selected from a plurality of candidate transformation operations.

9. The method of claim 8, wherein the training inputs are images and wherein the plurality of candidate transformation operations comprise one or more of:
a rotation operation;
a posterizing operation;
a sharpness operation;
a translation operation;
an auto-contrast operation;
a contrast operation;
a solarization operation;
a shearing operation;
a color operation;
a brightness operation;
a flipping operation;
a scale jittering operation;
an equalization operation;
an identity operation; or
a random cropping operation.

10. The method of claim 8, wherein determining a plurality of data augmentation policies further comprises, for each data augmentation policy:
determining, for each candidate transformation operation of the plurality of candidate transformation operations, a respective value for each of one or more third hyperparameters, wherein:
each third hyperparameter corresponds to a different particular position in the sequences of transformation operations selected for transforming training inputs; and
the third hyperparameter corresponding to a particular position in the sequences of transformation operations specifies a probability that the candidate transformation operation is selected as the transformation operation at the particular position in the sequence of transformation operations selected for transforming a particular input.

11. The method of claim 10, wherein each candidate transformation operation is selected with a same probability in each position in the sequences of transformation operations selected for transforming training inputs.

12. The method of claim 10, wherein, for each candidate transformation operation, the candidate transformation operation is selected with a same probability in each position in the sequences of transformation operations selected for transforming training inputs.

13. The method of claim 10, wherein:
the third hyperparameters are machine learned and comprise a respective selection parameter for each candidate transformation operation for each position in the sequences of transformation operations selected for transforming training inputs, and
training a machine learning model using a particular data augmentation policy comprises, for a given training input:
for each position in the sequence of transformation operations selected for transforming the given training input:
processing the respective selection parameter of the position corresponding to each candidate transformation operation using a softmax layer to generate a respective selection probability for each candidate transformation operation, and
selecting a transformation operation for the position in accordance with the respective selection probabilities;
processing the given training input to generate a transformed training input in accordance with the selected sequence of transformation operations;
processing the transformed training input using the machine learning model to generate a training output; and
adjusting current values of the selection parameters based on an error in the training output.

14. The method of claim 1, wherein determining a quality measure of a machine learning model that has been trained using a data augmentation policy comprises:
- determining a performance measure of the machine learning model on the particular machine learning task using validation data comprising a plurality of training inputs;
- determining the quality measure based on the performance measure.

15. The method of claim 1, wherein selecting the final data augmentation policy based on the quality measures of the machine learning models comprises selecting the determined data augmentation policy having the highest quality measure.

16. The method of claim 1, wherein the training inputs are images and the particular machine learning task is an image processing task comprising classification or regression.

17. A system comprising one or more computers and one or more storage devices storing instructions that are operable, when executed by the one or more computers, to cause the one or more computers to perform operations comprising:
- obtaining a training data set for training a machine learning model having a plurality of network parameters to perform a particular machine learning task, the training data set comprising a plurality of training inputs;
- determining a plurality of data augmentation policies, wherein each data augmentation policy defines a procedure for processing a training input to generate a transformed training input, wherein the procedure comprises selecting a sequence of one or more transformation operations to be applied to the training input, and wherein the determining comprises, for each data augmentation policy:
  - determining a value for a first hyperparameter that specifies a same number of transformation operations in each sequence of transformation operations selected for transforming a respective training input, and
  - determining a respective value for each of one or more second hyperparameters, wherein the second hyperparameters specify a same magnitude schedule for determining a magnitude for each transformation operation in each sequence of transformation operations selected for transforming a respective training input;
- for each data augmentation policy, training the machine learning model using the data augmentation policy, comprising:
  - determining an augmented training data set by processing the training inputs in the training data set to generate transformed training inputs in accordance with the data augmentation policy,
  - processing a particular transformed training input in the augmented training data set using current values for the plurality of network parameters of the machine learning model to generate a training output, and
  - generating a parameter update for the plurality of parameters of the machine learning model based on an error in the training output;
- determining, for each data augmentation policy, a quality measure of the machine learning model that has been trained using the data augmentation policy, wherein the quality measure of the machine learning model represents a performance of the machine learning model on the particular machine learning task as a result of training the machine learning model using the data augmentation policy; and
- selecting a final data augmentation policy based using the quality measures of the machine learning models.

18. The system of claim 17, wherein each transformation operation in each sequence of transformation operations is selected from a plurality of candidate transformation operations, and wherein determining a plurality of data augmentation policies further comprises, for each data augmentation policy:
- determining, for each candidate transformation operation of the plurality of candidate transformation operations, a respective value for each of one or more third hyperparameters, wherein:
  - each third hyperparameter corresponds to a different particular position in the sequences of transformation operations selected for transforming training inputs; and
  - the third hyperparameter corresponding to a particular position in the sequences of transformation operations specifies a probability that the candidate transformation operation is selected as the transformation operation at the particular position in the sequence of transformation operations selected for transforming a particular input.

19. One or more non-transitory computer storage media encoded with computer program instructions that when executed by a plurality of computers cause the plurality of computers to perform operations comprising:
- obtaining a training data set for training a machine learning model having a plurality of network parameters to perform a particular machine learning task, the training data set comprising a plurality of training inputs;
- determining a plurality of data augmentation policies, wherein each data augmentation policy defines a procedure for processing a training input to generate a transformed training input, wherein the procedure comprises selecting a sequence of one or more transformation operations to be applied to the training input, and wherein the determining comprises, for each data augmentation policy:
  - determining a value for a first hyperparameter that specifies a same number of transformation operations in each sequence of transformation operations selected for transforming a respective training input, and
  - determining a respective value for each of one or more second hyperparameters, wherein the second hyperparameters specify a same magnitude schedule for determining a magnitude for each transformation operation in each sequence of transformation operations selected for transforming a respective training input;
- for each data augmentation policy, training the machine learning model using the data augmentation policy, comprising:
  - determining an augmented training data set by processing the training inputs in the training data set to generate transformed training inputs in accordance with the data augmentation policy,
  - processing a particular transformed training input in the augmented training data set using current values for the plurality of network parameters of the machine learning model to generate a training output, and generating a parameter update for the plurality of parameters of the machine learning model based on an error in the training output;

determining, for each data augmentation policy, a quality measure of the machine learning model that has been trained using the data augmentation policy, wherein the quality measure of the machine learning model represents a performance of the machine learning model on the particular machine learning task as a result of training the machine learning model using the data augmentation policy; and selecting a final data augmentation policy based using the quality measures of the machine learning models.

20. The non-transitory computer storage media of claim 19, wherein each transformation operation in each sequence of transformation operations is selected from a plurality of candidate transformation operations, and wherein determining a plurality of data augmentation policies further comprises, for each data augmentation policy:

determining, for each candidate transformation operation of the plurality of candidate transformation operations, a respective value for each of one or more third hyperparameters, wherein:

each third hyperparameter corresponds to a different particular position in the sequences of transformation operations selected for transforming training inputs; and the third hyperparameter corresponding to a particular position in the sequences of transformation operations specifies a probability that the candidate transformation operation is selected as the transformation operation at the particular position in the sequence of transformation operations selected for transforming a particular input.

* * * * *